US009724972B2

(12) United States Patent
Zucchetti et al.

(10) Patent No.: US 9,724,972 B2
(45) Date of Patent: Aug. 8, 2017

(54) METHOD FOR THE ENCRYPTED RADIO TRANSMISSION OF DATA

(71) Applicant: Bayerische Motoren Werke Aktiengesellschaft, Munich (DE)

(72) Inventors: Cristian Zucchetti, Greenville, SC (US); Axel Schwab, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 13/900,695

(22) Filed: May 23, 2013

(65) Prior Publication Data

US 2013/0322629 A1 Dec. 5, 2013

Related U.S. Application Data

(63) Continuation of application No. PCT/EP2011/070715, filed on Nov. 22, 2011.

(30) Foreign Application Priority Data

Dec. 6, 2010 (DE) .................... 10 2010 062 469

(51) Int. Cl.
*H04L 9/00* (2006.01)
*H04L 9/08* (2006.01)
(Continued)

(52) U.S. Cl.
CPC ...... *B60C 23/0447* (2013.01); *B60C 23/0462* (2013.01); *H04L 9/00* (2013.01); *H04L 9/08* (2013.01); *H04L 2209/805* (2013.01)

(58) Field of Classification Search
None
See application file for complete search history.

(56) References Cited

U.S. PATENT DOCUMENTS 5,557,742 A * 9/1996 Smaha et al. .................... 726/22
5,705,982 A * 1/1998 Faltings ........................ 340/541
(Continued)

FOREIGN PATENT DOCUMENTS

DE  10 2008 038 680 A1  2/2009
EP      1 849 627 A1     1/2007
(Continued)

OTHER PUBLICATIONS

International Search Report dated Feb. 29, 2012 including English-language translation (Six (6) pages).
(Continued)

*Primary Examiner* — Farid Homayounmehr
*Assistant Examiner* — Thanh T Le
(74) *Attorney, Agent, or Firm* — Crowell & Moring LLP

(57) ABSTRACT

A method is provided for encrypted radio transmission of data telegrams spaced apart in time in a sequence between a transmitter and a receiver of a system, wherein a key is changeable and is cryptologically derived from a current piece of information. The time elapsed between a preceding telegram and the encrypted telegram implementing the desired data transmission is used as the key. The time span results from a value or entry of a parameter present in the system. The duration in the transmitter and the receiver is determinable from a previously transmitted value or entry of a parameter, or derived only in the transmitter and wirelessly transmitted to the receiver for a future telegram. In a motor vehicle tire pressure monitoring system, the transmitted data originate from a tire sensor and are wirelessly transmitted in an encrypted manner to a vehicle body.

13 Claims, 1 Drawing Sheet

(51) Int. Cl.
*B60C 23/04* (2006.01)
*G06F 21/00* (2013.01)
*H04W 12/00* (2009.01)

(56) References Cited

U.S. PATENT DOCUMENTS

| | | | |
|---|---|---|---|
| 6,408,391 B1* | 6/2002 | Huff et al. .................... 726/22 |
| 6,450,021 B1* | 9/2002 | Katou et al. ................. 73/146.5 |
| 6,463,798 B2* | 10/2002 | Niekerk ............. B60C 23/0425 |
| | | | 340/442 |
| 7,392,382 B1* | 6/2008 | Weis ..................... H04L 9/088 |
| | | | 173/160 |
| 7,640,585 B2* | 12/2009 | Lee et al. ........................ 726/22 |
| 7,810,389 B2* | 10/2010 | Brandl et al. ............... 73/146.5 |
| 8,198,993 B2 | 6/2012 | Kessler et al. |
| 8,387,142 B2* | 2/2013 | Christofferson ...... H04W 12/08 |
| | | | 380/221 |
| 2003/0112978 A1* | 6/2003 | Rodman .................. H04K 1/00 |
| | | | 380/277 |
| 2003/0156022 A1* | 8/2003 | Saheki ............... B60C 23/0464 |
| | | | 340/442 |
| 2004/0155764 A1* | 8/2004 | Ichinose ...................... 340/447 |
| 2006/0069650 A1* | 3/2006 | Hori .............................. 705/57 |
| 2006/0161327 A1* | 7/2006 | Emmerich .......... B60C 23/0408 |
| | | | 701/78 |
| 2007/0013499 A1* | 1/2007 | Hammerschmidt B60C 23/0408 |
| | | | 340/442 |
| 2007/0206838 A1* | 9/2007 | Fouquet ................... G06F 21/32 |
| | | | 382/115 |
| 2008/0018448 A1* | 1/2008 | Ghabra ............... B60C 23/0408 |
| | | | 340/447 |
| 2008/0055042 A1* | 3/2008 | Okada ................. B60R 25/2072 |
| | | | 340/5.61 |
| 2008/0294786 A1* | 11/2008 | Tinker ................. H04L 29/1249 |
| | | | 709/229 |
| 2008/0297337 A1* | 12/2008 | Marguet ............. B60C 23/0433 |
| | | | 340/447 |
| 2009/0046859 A1 | 2/2009 | Bichler et al. |
| 2009/0251289 A1* | 10/2009 | Amtmann .................... 340/10.1 |
| 2010/0098249 A1* | 4/2010 | Shin ....................... H04L 9/0872 |
| | | | 380/44 |
| 2011/0019825 A1* | 1/2011 | Shearer .................. G08C 17/02 |
| | | | 380/270 |
| 2011/0246101 A1 | 10/2011 | Araki et al. |
| 2012/0000277 A1* | 1/2012 | Fischer ................. B60C 23/041 |
| | | | 73/146.3 |
| 2012/0208479 A1* | 8/2012 | Pistor ........................ H04B 1/04 |
| | | | 455/129 |
| 2014/0070936 A1* | 3/2014 | Schwab ............. B60C 23/0457 |
| | | | 340/447 |

FOREIGN PATENT DOCUMENTS

| | | |
|---|---|---|
| EP | 2 163 407 A2 | 3/2010 |
| JP | 2010-133891 A | 6/2010 |
| WO | WO 2007/144798 A2 | 12/2007 |

OTHER PUBLICATIONS

German Search Report dated Oct. 6, 2011 including partial English-language translation (Ten (10) pages).

\* cited by examiner

METHOD FOR THE ENCRYPTED RADIO TRANSMISSION OF DATA

CROSS REFERENCE TO RELATED APPLICATIONS

This application is a continuation of PCT International Application No. PCT/EP2011/070715, filed Nov. 22, 2011, which claims priority under 35 U.S.C. §119 from German Patent Application No. DE 10 2010 062 469.1, filed Dec. 6, 2010, the entire disclosures of which are herein expressly incorporated by reference.

BACKGROUND AND SUMMARY OF THE INVENTION

The invention relates to a method for the encrypted radio transmission of data, in the form of short telegrams mutually spaced apart in time, between a transmitter and a receiver of a system, wherein the key can be changed and is derived from a current piece of information according to a crypto-logical method. This method can particularly be used in a tire pressure control system of a motor vehicle, wherein the data to be transmitted originate from a sensor provided in a vehicle tire and are wirelessly transmitted in an encrypted manner to a receiver provided at the vehicle body. With respect to the technical environment, reference is, for example, made to German Patent document DE 10 2008 038 680 A1.

In principle, an encrypting of telemetrically transmitted data is known, such encryption not only importantly protects against eavesdropping, but should also prevent the data receiver from receiving manipulated data or allow for the recognition of data as not originating from the assigned transmitter. Telemetric data transmission plays an increasingly significant role also in motor vehicles. Newer tire pressure control systems, for example, determine a pressure loss of a vehicle tire no longer from a comparison of the rotational wheel speeds of the different vehicle wheels and also no longer by way of an analysis of the vertical vibrations of the wheel determinable, for example, at the shock absorber, but rather by a current measurement of the air pressure in the tire, for which a pressure sensor is provided in the tire. These measured values can be transmitted in a relatively simple manner only by radio to an electronic monitoring unit, which is arranged at the vehicle body.

Currently, this radio transmission in tire pressure control systems takes place in the form of standardized so-called telegrams by way of an essentially defined radio frequency in an unencrypted manner. At most, a slight randomized displacement of the sending points in time of the telegrams may be provided here in order to avoid a continuous frequency cancellation. At least theoretically, in this case, by means of computer-controlled radio transceivers, the transmitted data could not only be tapped, but manipulated data could also be sent out and thereby enter the above-mentioned electronic monitoring unit of a motor vehicle. If these manipulated data were to point to a severe pressure loss, the driver of the motor vehicle would then be prompted to come to a stop. This could therefore theoretically be used for attacking the motor vehicle or its occupants. One remedy to be considered would be an encrypted radio transmission. However, customary keys lengthen the data quantity to be transmitted, which may basically be undesirable but, in the case of a tire pressure control system, may be particularly undesirable because the capacity of the battery provided in addition to the transmitter and the pressure sensor, as well as possibly additional sensors in the tire, for supplying these above-mentioned elements with electric power, would thereby represent an additional or increased load. The battery should, however, have a service life that is as long as possible.

An encryption for telemetrically transmitted data therefore is needed which does not result in any, at least in no significant, lengthening of the data telegrams to be transmitted.

For a method for the encrypted radio transmission of data according to the invention, this need is met in that the time period elapsed between a preceding telegram and the encrypted telegram implementing the desired data transmission is used as the key, this time period being the result of a value or amount of a parameter present in the system. Advantageous embodiments are described and claimed herein.

The present invention is based on the idea of not sending the above-mentioned telegrams in a fixed time slot pattern but determining the sending point-in-time within specific time slots by means of a cryptological process, so that the sending point-in-time itself represents the key information. Thus, the time interval between two mutually successive telegram emissions can be represented as follows:

$\Delta t(m) = t_{Tx}(m) - t_{Tx}(n)$, wherein $t_{Tx}(n)$ is the point-in-time at which the telegram having the number n was sent, and $\Delta t(m) > 0$ is an essentially cryptological function of at least one parameter known in the system. Preferably, this characteristic quantity in the form of a value or amount of a parameter present in the system and the above-mentioned cryptological function $\Delta t(m)$ are known in the transmitter as well as in the receiver because then the time period between a preceding sent telegram and a telegram currently to be sent or received can be determined in the transmitter as well as in the receiver from a precedingly transmitted value or amount of a characteristic quantity. However, when this preferably changeable parameter is known only in the transmitter, the time period can naturally also only be determined in the transmitter, so that this time period has to be wirelessly transmitted to the receiver for a future telegram. Although, by means of this information to be additionally transmitted, the data quantity to be transmitted is slightly enlarged, the expenditures for the transmission of this additional information is arguably low, specifically also when this additional information is transmitted in an encrypted manner according to a known method.

When applying the method according to the invention in a tire pressure control system of a motor vehicle, in which case the data to be transmitted originate from a sensor provided in a vehicle tire and are wirelessly transmitted in an encrypted manner to a receiver provided at the vehicle body, various parameters can be used for determining the above-mentioned time period. The value or amount, for example, of the pressure in the tire determined by the above-mentioned sensor can be used as a physical or electric parameter; in addition or as an alternative, the temperature in the tire determined by a sensor can be used. However, the appropriately determinable rotational speed and/or rotating direction of the tire or the vertical tire force on the road determined by way of a sensor or the residual service life of the battery provided in the tire can also be used. In each case, a combination of several parameters also is selectable. The same applies when the identification number (for example, of the pressure sensor) transmitted for the differentiation of the tires or a time period used as a key in a preceding transmission step is used as the characteristic quantity (or parameter).

For tire pressure control systems with a radio transmission of data, it is currently known to specify a so-called standardized radio telegram which is to be sent at least once per minute in the form of a base telegram with pressure and temperature information. This specification, which also applies to the manufacturer, ensures the compatibility for a minimum function, specifically for the pure pressure warning. Various manufacturers of motor vehicles transmit further data in addition to this base telegram, which data can be used, for example, for an automatic driving dynamics control of the vehicle. In the case of a tire pressure control system operating according to the invention, it may now be provided that these specified standardized radio telegrams are used only for marking the time synchronization, while manufacturer-specific telegrams with additional information and, particularly, with information encrypted according to the invention concerning the tire pressure and the relevant temperature between these standardized radio telegrams, are transmitted while applying the method according to the invention. In this sense, generally, i.e. not limited to a tire pressure control system, a preceding telegram can essentially be transmitted only for defining the beginning of the time period for the encrypted telegram carrying out the desired data transmission. Incidentally, the bit length of the key according to the invention can optionally still be extended in that, in addition to the bit information, which is transmitted by way of the sending point-in-time, a further bit sequence is added to the telegram. As a result, the bit length can be dynamically adapted to the protection needs of the data to be transmitted.

According to an advantageous further development, the above-mentioned time period is determined while additionally taking into account marginal conditions, specifically, with a view to how frequently the transmitted data or information are needed within a defined time period. Thus, for example, at higher driving speeds of the vehicle, a more frequent data transmission is desired than at a lower driving speed because, at least in the case of the conventional radio transmission, the yield of correctly received information is lower because of the cancellation effects at higher driving speeds. Furthermore, in the case of the latter, the probability of significant changes is also greater. In this sense, the determination of the above-mentioned time period between mutually successive telegrams can take place such that, as a function of the rotational speed of the tire, a shorter time period will be obtained at a higher speed than at a lower speed. When a dependence of the above-mentioned time period on the tire pressure is selected, a shorter time period may usefully be obtained when, viewed over successive telegrams, the change of pressure is relatively large, while a greater time period is obtained when, viewed over successive telegrams, virtually no change of pressure can be determined. As an alternative, the absolute value of the pressure in the tire measured by the sensor can be taken into account to the extent that shorter time periods are selected at relatively low pressure values and thus a greater number of telegrams are sent within a certain time period.

It may further be provided that misinformation that is received by the receiver in a time window that does not correspond to the time duration used as a key, is registered and stored as such. It can thereby be determined whether a targeted manipulation attack has taken place; i.e. whether misinformation was sent to the receiver in a targeted manner, in which case the driver of the vehicle can be correspondingly informed. In this context, by way of further antennas at the vehicle, the distance and the location of the source of the attack can also be estimated. In addition, by means of the above-mentioned conventional standardized radio telegram of a tire pressure control system, a position tracking spy system could prove by means of the reception of a transmitted identification number of a sensor that a certain vehicle was located at a certain time in a certain location and thereby violate the driver's privacy. With the method according to the invention, the probability of success of such a spy system is considerably reduced, specifically not only when, as optionally provided, fewer telegrams are sent at low driving speeds but particularly also because a one-time reception of an identification number is not sufficient for a sound reasoning that a vehicle was in a certain location, but several telegrams are required which have the correct time interval. This would not only increase the complexity of a position tracking spy system, but, particularly because of the progressive motion of the vehicle, it is not possible to receive several telegrams from a fixed antenna or a tracking system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
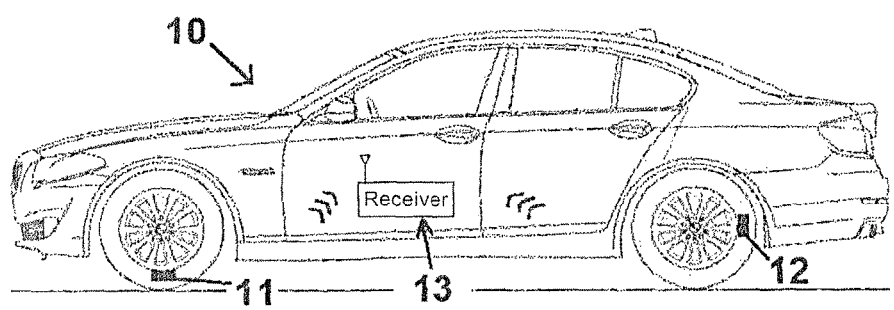
FIG. 1 is a view of a passenger car, in which a tire pressure control system is installed which operates by way of a radio transmission according to an embodiment of the invention.

In FIG. 1, reference number 10 illustrates a vehicle in the form of a conventional passenger car. A transmitter is arranged in each wheel of the vehicle—in this case, the transmitter 11 is located in the left front wheel, and the transmitter 12 is located in the left rear wheel. Each transmitter transmits data from the respective vehicle tire, particularly the pressure existing in the tire (=filling pressure of the respective tire) and the temperature existing in the tire, in a wireless and, in this case, encrypted manner to a receiver 13 mounted at the vehicle body. An electronic control and computer unit, which is not shown separately, is connected to the receiver 13, which control and computer unit appropriately evaluates the received signals. A small electronic control unit is also provided in each transmitter 11, 12, which control unit causes, among other things, the emission of the respective signals to the transmitter.

Figure 2:
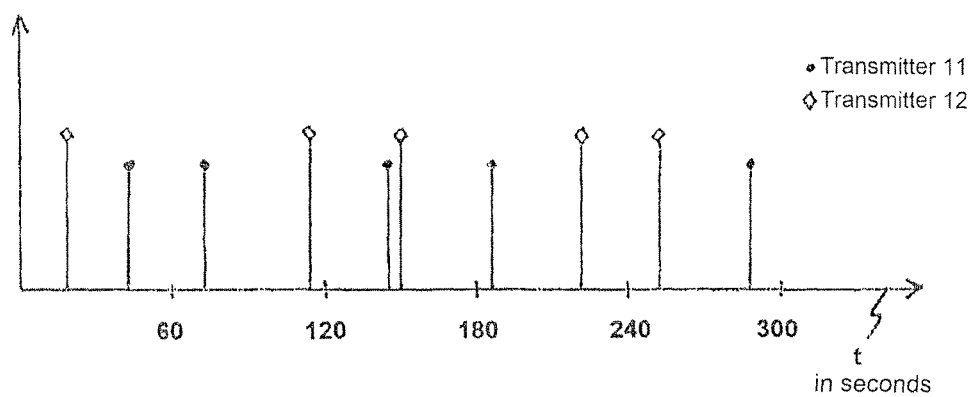
FIG. 2 is a diagram illustrating an example of transmission telegrams of two wheels of the vehicle over time t.

FIG. 2 is a diagram illustrating the transmission telegrams of the two transmitters 11, 12 over a time period of 300 seconds (time t plotted in seconds on the abscissa). The received field intensity, for example, is plotted on the ordinate; the content of the individual telegrams is not shown here but is also not important for the present description of the figures. It is only noted, that those transmission telegrams whose top end in the figure has a filled-in circle, originate from the transmitter 11, whereas those telegrams whose top end is formed by a not filled-in diamond originate from the transmitter 12. As illustrated in FIG. 2, each transmitter 11, 12 transmits one telegram respectively within 60 seconds, the exact transmitting points-in-time being selected in an apparently arbitrary fashion to an outsider, but are determined according to the above-described method and represent the key for the above-described encryption.

In addition to the secure data transmission, on the basis of which a manipulation can be reliably recognized because, without the knowledge of the encryption mode, it is technically not possible to compute the correct transmitting point-in-time, the method according to the invention is characterized in that, during the transmission, battery consumption is virtually not increased because the transmission duration is not extended in comparison to the prior art. In the case of a tire pressure control system, the collision probability of telegrams of the different vehicle wheels is advantageously reduced because the above-mentioned parameters are largely independent of one another.

In the same example of an application, the above-mentioned standardized radio telegrams can advantageously be transmitted further so that compatibility exists with all commercially obtainable systems. Furthermore, absolute protection from spying can be ensured in the case of a high data security demand of a vehicle by an additional encryption of the above-mentioned identification number. Finally, it becomes possible to use the method according to the invention so that the programming of tire information in tire sensors can only take place by qualified personnel in secure shop processes; i.e. by means of an authentication process, the wheel electronics systems with the tire data assigned to the vehicle being fixedly assigned to a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for encrypted radio transmission of data between a transmitter and a receiver of a tire pressure control system, wherein data to be transmitted originates from a sensor provided in a vehicle tire wirelessly transmitted in an encrypted manner to the receiver provided at a vehicle body, the method comprising the acts of:
   transmitting encrypted short telegrams mutually spaced apart in time, wherein an encryption key is changeable;
   setting a time period between a preceding telegram transmission and a scheduled transmission of a current telegram to be transmitted in the future, wherein the time period is set based on a value or an amount of a parameter present in the system;
   using the time period as the encryption key for encrypting said current telegram to be transmitted; and
   transmitting the data from the transmitter to the receiver via the encrypted current telegram.

2. The method according to claim 1, wherein the value or the amount of one of the following parameters or a quantity derived therefrom is used for defining the time period:
   a pressure in the vehicle tire determined by the sensor,
   a temperature in the vehicle tire determined by the sensor,
   a rotational speed of the vehicle tire,
   a rotating direction of the vehicle tire,
   a vertical tire force on a roadway,
   a residual service life of a battery provided in the vehicle tire,
   an identification number of the sensor, and
   a time period used as a key in a preceding transmission.

3. The method according to claim 1, wherein the time period in the transmitter and in the receiver is set from a preceding transmitted value or amount of a parameter by each of the respective transmitter and receiver.

4. The method according to claim 2, wherein the time period in the transmitter and in the receiver is set from a preceding transmitted value or amount of a parameter by each of the respective transmitter and receiver.

5. The method according to claim 1, wherein the time period is set only in the transmitter and is wirelessly transmitted to the receiver for the current telegram prior to the transmission of the current telegram.

6. The method according to claim 2, wherein the time period is set only in the transmitter and is wirelessly transmitted to the receiver for the current telegram prior to the transmission of the current telegram.

7. The method according to claim 1, wherein the preceding telegram is transmitted essentially only for defining a beginning of the time period for the current telegram implementing the desired data transmission.

8. The method according to claim 2, wherein the preceding telegram is transmitted essentially only for defining a beginning of the time period for the current telegram implementing the desired data transmission.

9. The method according to claim 2, wherein the setting of the time period is carried out such that:
   as a function of the vehicle tire pressure, a shorter time period is obtained when, viewed over successive telegrams, a change of pressure is relatively large, whereas a greater time period is obtained when, viewed over successive telegrams, virtually no change of pressure is determinable, and
   as a function of the rotational speed of the vehicle tire at a higher speed, a shorter time period is obtained than at a lower speed.

10. The method according to claim 1, wherein misinformation received by the receiver in a time window not corresponding to the set time period used as the encryption key is registered and stored as misinformation.

11. The method according to claim 1, further comprising:
   an scheduled transmission time, corresponding to a time at which the current telegram is scheduled to be transmitted in the future, based on a cryptological function and on the value or amount of the parameter present in the system,
   wherein the time period is set based on a difference between the scheduled transmission time and the preceding telegram transmission.

12. The method according to claim 11, further comprising:
   transmitting the current telegram at the scheduled transmission time.

13. A method for encrypted radio transmission of data between a transmitter and a receiver of a tire pressure control system, wherein data to be transmitted originates from a sensor provided in a vehicle tire wirelessly transmitted in an encrypted manner to the receiver provided at a vehicle body, the method comprising the acts of:
   transmitting encrypted short telegrams mutually spaced apart in time, wherein an encryption key is changeable;
   setting an scheduled transmission time corresponding to a time at which a current telegram is scheduled to be transmitted in the future based on a cryptological function and on the value or amount of the parameter present in the system;
   calculating a time period based on a difference between the scheduled transmission time and the preceding telegram transmission, wherein the time period is defined by a difference between the scheduled transmission time and the preceding telegram transmission;

using the calculated time period as the encryption key for encrypting said current telegram to be transmitted for transmitting the data from the transmitter to the receiver; and transmitting the current encrypted telegram at the scheduled transmission time.

\* \* \* \* \*